J. G. KNIGHT.
OUTLET BOX.
APPLICATION FILED AUG. 24, 1912.
1,210,492.
Patented Jan. 2, 1917.
2 SHEETS—SHEET 1.
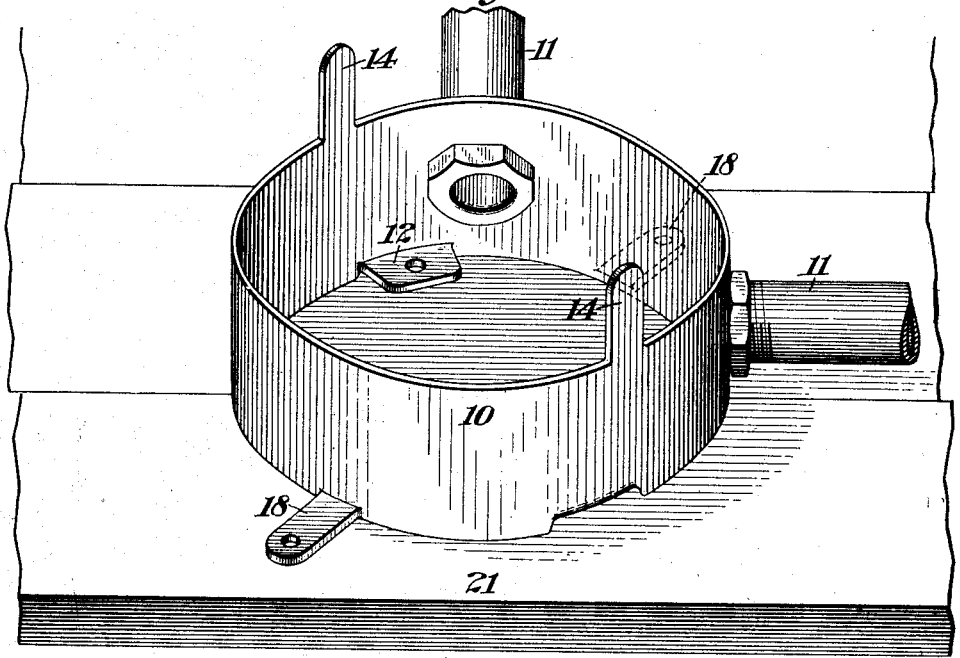
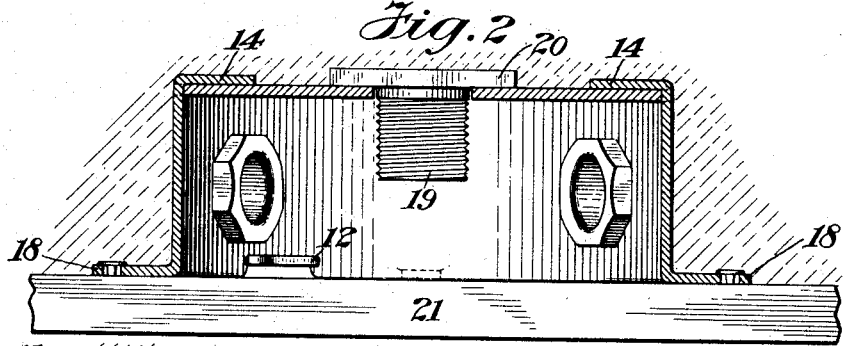
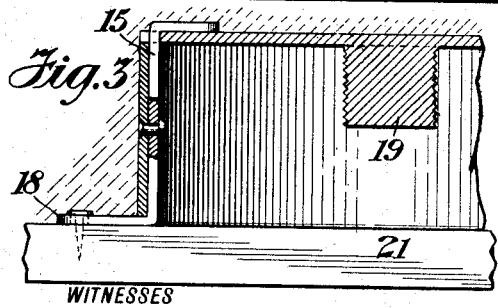
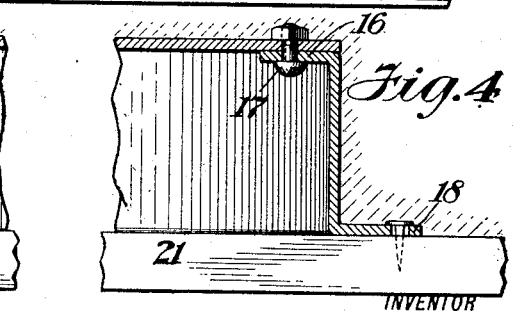
WITNESSES
Chas. F. Clagett
INVENTOR
Julian Gadon Knight
BY
G. C. Allan ATTORNEYS J. G. KNIGHT.
OUTLET BOX.
APPLICATION FILED AUG. 24, 1912.
1,210,492.
Patented Jan. 2, 1917.
2 SHEETS—SHEET 2.
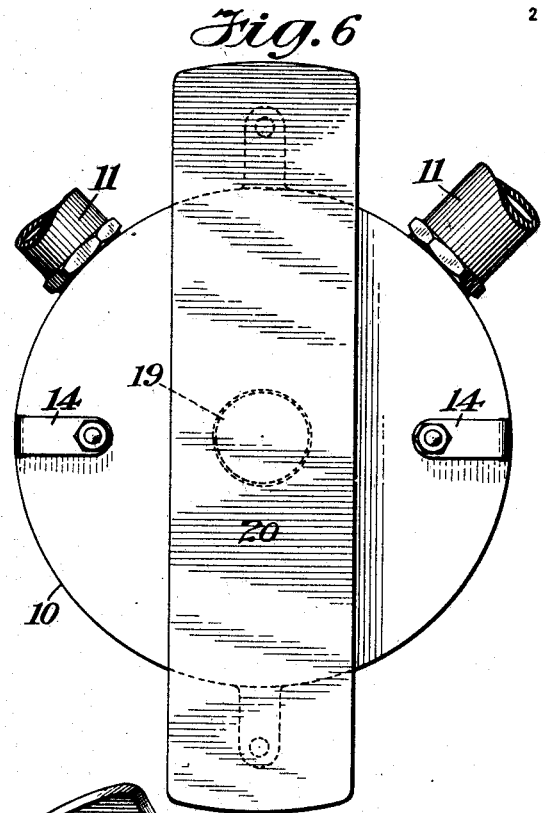
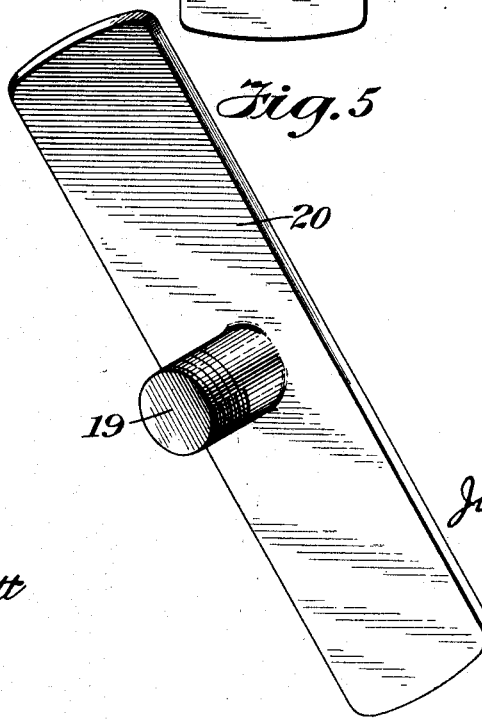
WITNESS
Chas. F. Clagett
Julian G. Knight
INVENTOR
BY G. C. Dean
ATTORNEY

UNITED STATES PATENT OFFICE.

JULIAN GORDON KNIGHT, OF NEW YORK, N. Y., ASSIGNOR TO J. GORDON KNIGHT ELECTRIC COMPANY, INC.

OUTLET-BOX.

1,210,492.  Specification of Letters Patent.  Patented Jan. 2, 1917.

Application filed August 24, 1912. Serial No. 716,885.

*To all whom it may concern:*

Be it known that I, JULIAN GORDON KNIGHT, a subject of the King of Great Britain, and resident of New York city, Morris Park, borough of Queens, in the county of Queens and State of New York, have invented certain new and useful Improvements in Outlet-Boxes, of which the following is a specification.

My invention involves certain improvements relating to the installation of electrical conductors and outlet boxes, and more particularly relates to the construction of the box and the method of installing the same. In the ordinary wiring systems, outlet and junction boxes in the form of cups with peripheral walls and inner end walls are installed with their open ends adjacent to or substantially flush with the exposed surface of the wall or ceiling and one or more conduits for the wires are connected to the sides or top of the boxes.

In concrete buildings or in buildings having concrete or other similar flooring or floor arches, it is common practice to place the conduits and outlet boxes in position upon the forms prior to the filling in of the concrete. The conduits are usually secured to the walls of the boxes by nuts or other suitable fastening members inside of the boxes upon the inwardly-projecting conduit ends. After placing the conduits and boxes, it is necessary to lift up the boxes so that the workman may reach into the box from the under side to place and tighten the nut or other fastening member, or else he may rotate the box about the conduit so that the open side will be uppermost and render the fastening device accessible. After securing the fastening member, the return rotation of the outlet box to a downwardly-facing position often loosens or even disengages the fastening. Furthermore, after the conduits are connected to the boxes, both are liable to be shifted laterally or even raised slightly during the filling in and tamping down of the concrete or other plastic material.

In carrying out my invention, I form the outlet box so that the interior is accessible from the top or upper side after the box has been placed and secured on the form, and thus permit the ready and rigid attachment of the conduits and the tightening of the fastening members without moving or in any way disturbing the position of the outlet box. The box has a cover or top wall separate from the peripheral wall, so that the latter may be fastened down to the form in the exact position desired, and after the conduits have been secured thereto upon the interior of the box, access being gained through the open top of the box, the cover or top wall is placed over the open top and the concrete is then filled in without liability of disturbing the box or the conduits. Thus, I am able to positively insure the accurate positioning of the box, the firm attachment of the conduits, and, due to the ease of attachment of the conduits, greater speed of installation may be secured.

A very simple and efficient means for securing the cover in place involves the provision of upstanding lugs either integral therewith or rigidly secured to the side walls of the box and which may be bent over into locking engagement with the cover after the conduits are attached. A separable cover or top wall has an added advantage in that it may be formed heavier and have a fixture support more readily formed integral therewith than when the cover is integral with the remainder of the box, or the cover may be of thinner material and a fixture support may project through the cover and be carried by a bracket or other anchoring means embedded in the concrete above or at the sides of the box.

My invention is not limited to any particular type, form or shape of box, or any particular means for attaching the conduit thereto except as hereinafter particularly pointed out and defined in the claims.

Reference is to be had to the accompanying drawings, forming a part of this specification, in which similar characters of reference indicate corresponding parts in all the views, and in which—

Figure 1 is a perspective view showing a part of my improved outlet box in position and prior to the placing of the top wall or cover; Fig. 2 is a central vertical section showing the construction completely installed; Figs. 3 and 4 are sectional details showing modified forms of lug and cover construction; Fig. 5 is a perspective view of the fixture support and the attached bar shown in Fig. 2, and Fig. 6 is a top plan view of the construction shown in Fig. 2.

My improved outlet box includes a peripheral wall 10, which may be circular, square, or of any other desired cross section and may be of the size, proportions and material commonly employed in the art. This peripheral wall may have plugged openings therein or weakened lines along which the metal may be broken to form apertures, or may be adapted in any other manner for the attachment of one or more conduits 11. The box is open at the lower side or bottom although either before or after the box is installed, a bottom or cover may be provided and secured in place in any suitable manner, as, for instance, by screws threaded into lugs 12. The most important feature of my improved box is the separable top or cover which may be formed of the same material as the peripheral wall and of such size and shape as to fit the open top. A very simple means for attaching the cover involves the formation on the peripheral wall 10, of lugs 14, which project above the plane of the upper edge of the peripheral wall and may extend through recesses in the edge of the cover. These lugs may be bent over into engagement with the upper surface of the top wall after the latter is placed in position and serve not only to retain the cover against upward movement but the engagement of the lugs in the recesses prevents the lateral shifting of the cover even though only two lugs be employed. The lugs may be integral, as shown in Figs. 1 and 2, or they may be the upper ends of bars or strips of metal 15 secured to the peripheral wall in any suitable manner, as, for instance, by one or more rivets. As shown in Fig. 4, lugs 16 are bent over to lie below the plane of the upper edge of the peripheral wall and the cover is secured to these lugs by suitable bolts or screws 17.

For retaining the box in position upon the false-work or temporary support 21 for the concrete, the peripheral wall may be provided with outwardly-extending lugs 18 adjacent to its lower or bottom edge. These lugs may be either integral with the peripheral wall or they may constitute the outwardly-extending lower ends of the strips or bars 15, as shown in Fig. 3. As shown, they are perforated to receive nails, tacks or the like.

The cover may carry a fixture support in the form of a threaded stud 19, which may either be integral with or permanently attached to the cover or top wall, as shown in Fig. 3, or it may be carried by a bar 20 and extend downwardly through an aperture in the cover. Such a bar as is shown in Fig. 2, may extend across above the cover and project outwardly beyond the peripheral wall of the box as shown in Fig. 6 so as to be thoroughly anchored in the concrete. The bar may rest on top of the box after being placed and prior to the admission of the concrete.

In the practice of my improved method and the installation of my improved boxes, the peripheral wall portion of the box may be accurately placed upon the false-work or temporary support 21 of the concrete and may be directly attached to the latter by tacks or short nails driven through the lugs 18. The conduit or conduits are projected through the provided apertures in the peripheral wall and may be rigidly and permanently secured in place without disturbing the box as access may be readily gained to the interior of the box through the open top. After the conduits are attached, the cover may be put on for the first time and permanently secured by bending over the lugs 14, or in any other suitable manner. If a separate anchoring piece with its fixture support is employed, it is then placed in position as indicated in Fig. 2. The concrete, cinder concrete or any other material going to make up the floor, may then be filled in to thoroughly cover and conceal the conduits and outlet boxes and no great care need be exercised in placing or tamping the concrete as the box is held against lateral, as well as vertical, movement and cannot readily be displaced. After the concrete has been filled in and has hardened, the false-work or temporary support 21 may be pulled away and the projecting ends of the tacks or nails in the lugs 18 may be bent over or cut off.

The peripheral wall portion of my improved box may be used as an outlet or junction box in a vertical wall or in any other position where it is desirable to gain access to the box from opposite sides.

I claim:

1. An outlet box having a perforated peripheral wall through which leading-in wires may extend, a detachable top wall, an anchoring bar resting upon said top wall and supported thereby and of a length materially greater than the diameter of said top wall, whereby the extremities project beyond the box to independently support the bar, and a fixture support carried by said bar and projecting through said top wall.

2. An outlet box having a perforated peripheral wall through which leading-in wires may extend, a top wall, an anchoring bar resting upon said top wall and supported thereby and of a length materially greater than the diameter of said top wall, whereby the extremities project beyond the box to independently support the bar, and a fixture support carried by said bar and projecting through said top wall.

3. An outlet box having a perforated peripheral wall through which leading-in wires may extend, a fixture support within said box and a member secured to said fixture support and detachable from said peripheral wall and supported thereby during the installation of the box and projecting materially beyond said peripheral wall whereby said member may sustain the weight of said fixture support independently of said peripheral wall when said box is covered over with concrete.

Signed at New York city in the county of New York and State of New York this 22nd day of August A. D. 1912.

JULIAN GORDON KNIGHT.

Witnesses:
FLORENCE LEVIEN,
JAMES D. BROWN.

Copies of this patent may be obtained for five cents each, by addressing the "Commissioner of Patents, Washington, D. C."